Aug. 9, 1927.
W. F. RESCHKE
1,638,213
SHOCK ABSORBER FOR OIL WELL PUMP RODS
Filed June 15, 1925
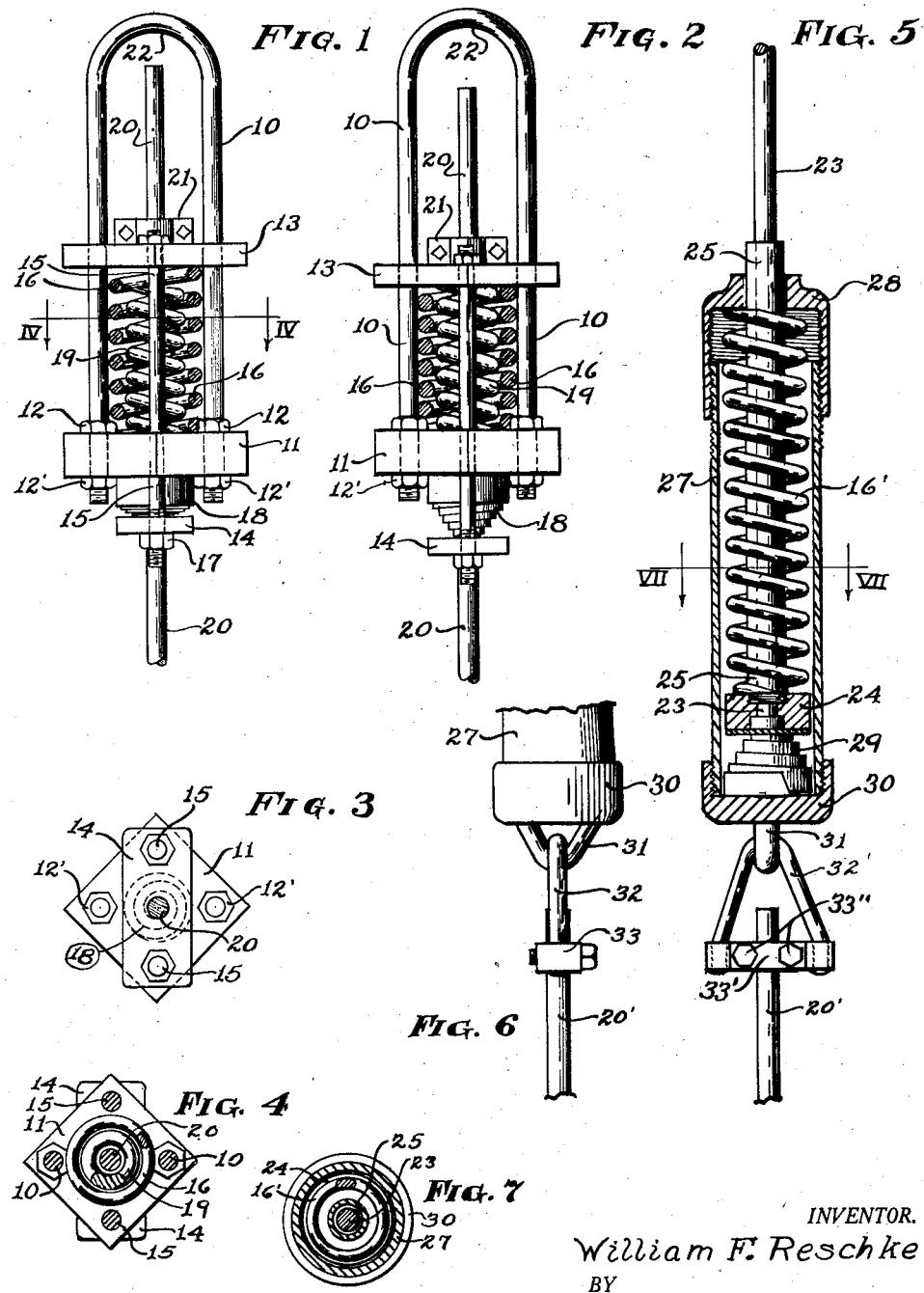
INVENTOR.
William F. Reschke
BY
ATTORNEY.

Patented Aug. 9, 1927.

1,638,213

UNITED STATES PATENT OFFICE.

WILLIAM F. RESCHKE, OF WICHITA, KANSAS.

SHOCK ABSORBER FOR OIL-WELL PUMP RODS.

Application filed June 15, 1925. Serial No. 37,193.

My invention relates to a shock absorber for oil well pump rods; and has for its object resilient means for absorbing the usual force of the reciprocations of the walking beam.

A further object of my invention is that by the use of my shock absorber a smaller pump rod may be employed.

A still further object of my invention is to provide a shock absorber that will function for the upward and downward stroke.

A still further object of my invention is to provide a multiple of springs in the shock absorbing element in such a way that as the load increases the compression of said springs will be reinforced by the adjacent spring when compression is sufficient to engage thereon.

Referring to the drawings; Fig. 1 is a side view of the shock absorber as it stands normally without a load. Fig. 2 is a side view of the shock absorber as it appears when it is taking the peak load. Fig. 3 is a bottom plan view of Fig. 1. Fig. 4 is a sectional view taken on the line IV—IV in Fig. 1. Fig. 5 is a modified form of the shock absorber. Fig. 6 is a side view of Fig. 5. Fig. 7 is a sectional view taken on the line VII—VII. In Fig. 2, 10 is a U-shaped member the ends of which pass through a square block 11, and made rigid therewith by the nuts 12 and 12'. Slidably mounted on this U shaped member 10 is a square plate 13, connected to a bar 14, by the rods 15. Said rods 15 are adapted to slide through the block 11. Between the block 11 and plate 13 is a spring 16, the tension of which is adjusted by the nuts 17 on the rods 15. Between the block 11 and the bar 14 is a flat conical spiral spring 18, which while it rests between the bar 14 and block 11 is tensioned against the spring 16 by means of the rods 15 and their adjustments functioning as a rebound cushion.
19 is a spring enclosed by the spring 16, as shown in Fig. 1. The said spring resting on the block 11 but is normally shorter than spring 16, and when the peak load is imposed thereon, the capacity of spring 16 is reinforced when compressed to engagement with spring 19, both of said springs engaging between said block and plate substantially as shown in Fig. 2. 20 is the pump rod, which passes thru the bar 14, spring 18, block 11, spring 19, and plate 13, and is held by clamp 21. Any suitable means may be employed to connect the loop 22 to the walking beam preparatory to pumping. In consideration of the column of oil in the shaft of an oil well, a certain amount of buoyancy exists as resistance against the drop of the pump rod, for this cause spring 18 will function at the moment of the change of travel, and at the maximum of the stroke downward, springs 16 and 19 will function for the gradual start of the upward stroke. On old methods employed the pump rod was not sufficient in strength to stand the sharp jerk of the walking beam raising the column of oil instantly, which often causes frequent breaking of the rod.

By using my shock absorber, the walking beam may continue its speed and momentum and the shock absorber will accommodate at the moment of reversed motion. Considering the six foot stroke in pumping, the springs may be compressed, even more than shown in Fig. 3, but before the up stroke is completed, the shock absorber would be expanded back to its position, as shown in Fig. 1. Fig. 5 shows a modification of this invention. The rod 23 is connected to the walking beam and its lower end is riveted into a stop 24. The pipe 25 is placed over the rod 23 and is screwed into the stop 24, for the purpose of protecting the rod 23 in its reciprocations coacting with the shock absorber.

Between the stop 24 and the cap 28 is mounted the spring 16' and as the cap 28 is screwed to sleeve housing 27, the spring 16' is tensioned against the stop 24 which in turn produces a tension on the flat spiral spring 29. The tension on the combined springs is adjusted by means of the cap 28, being threaded on the sleeve 27. On the lower end of sleeve 27 is a cap 30, which is provided with an eye 31, engaging a link 32, said link connected to a clamp 33, the said clamp having a block 33' tensioned by bolts 33'' as means for holding firmly the pump rod 20'. You will note the action of this modification in Fig. 5 is identical with that of Figs. 1 and 2 but with a construction varying as follows.

In Fig. 5, one spring is used, but two may be used such as 16 and 19 in Fig. 2 if desired.

I am aware that springs have been employed as shock absorbers to check the momentum of rapidly moving parts; but my invention relates to a shock absorber vertically disposed, having gravity and buoyancy to contend with, that is to say, the resistance of a confined column of oil against the downward movement of a pumping mechanism and the instant return of the walking beam raising the load imposed thereon, the full stroke being maintained.

Such modifications may be employed as lies within the scope of the appended claims but what I claim as new and desire to secure by Letters Patent is:

1. In an oil well pump shock absorber, a block and U-shaped member adapted to be connected to a walking beam, a plate connected to a pump rod, springs between said plate and block, said pump rod slidably engaging through a centrally positioned aperture in said block and being carried by said plate, a bar connected to said pump rod, rods connecting said bar to said plate, a spring engaging between said bar and said block functioning as a rebound cushion.

2. In an oil well pump shock absorber, in combination with a pump rod and means for operating same, a member adapted to be connected to the walking beam and a member connected to the pump rod, said members slidably engaging with each other, a plate on the pump rod member and a block on the walking beam member, springs engaging between said plate and block to absorb the upward pull of the walking beam, a bar on the pump rod, having a short space between said bar and the block of said walking beam member, a spring engaging between said bar and block functioning as a rebound absorber for the pump rod, all substantially as specified.

3. In a shock absorber, a U-shaped member as hanging means to a walking beam, a block rigidly carried by the said member, said block being a seat for springs engaging on both sides thereof, a plate slidably engaging on the U-shaped member, rods connected to said plate, the said rods slidably engaging through apertures in said block functioning as guides for the rectilinear movement of said plate and block, a pump rod slidably engaging through an aperture in the block and being carried by the plate, a clamp rigidly attached to said pump rod and bearing on said plate, a spring engaging between said block and plate and a spring within said spring, last said spring being of lesser length than the first said spring for increased tension as first said spring is being compressed, a spring between said bar and block functioning as a rebound cushion, all substantially as shown and for the purpose described.

4. In a shock absorber, a U-shaped member rigidly supporting a rectangular block at the diagonal corners of said block, a rectangular plate having apertures through the corners thereof, said plate slidably engaging on said U-shaped member, rods pendantly supported by said plate, a bar having an aperture in the center and one in each end thereof, last said apertures to engage on the lower extremity of said rods and rigidly carried thereby, a flat conical spring positioned between the bar and the block, a pair of springs between the plate and the block, one being positioned within the coils of the other and being of lesser length to receive excess compression, a pump rod slidably engaging through the bar and the block and passing through the aperture in the plate, a clamp rigidly attached to the pump rod to carry said rod on the plate, all as, and for the purpose described.

In testimony whereof I have hereunto affixed my signature.

WILLIAM F. RESCHKE.